Dec. 7, 1971 R. C. HUBER 3,624,924

BUSINESS ANSWERS DEVICE

Filed Jan. 29, 1970 2 Sheets-Sheet 1

Inventor
RUSSELL C. HUBER
By Neil E. Hamilton
Attorney

BUSINESS ANSWERS DEVICE

Filed Jan. 29, 1970 2 Sheets-Sheet 2

Inventor
RUSSELL C. HUBER
By Neil E. Hamilton
Attorney

United States Patent Office 3,624,924
Patented Dec. 7, 1971

1

3,624,924
BUSINESS ANSWERS DEVICE

Russell C. Huber, 3121 52nd St., Kenosha, Wis. 53140
Filed Jan. 29, 1970, Ser. No. 6,790
Int. Cl. G09b *19/18*; G06c *3/00*
U.S. Cl. 35—24 R 10 Claims

ABSTRACT OF THE DISCLOSURE

A chart for determining business factors is removably secured to a backing member and orientated thereon by a post to which are attached stretchable cords. The cords are positioned on the chart by a magnetized holder and the chart is removably secured to the backing member by magnets.

BACKGROUND OF THE INVENTION

This invention relates to a device for finding answers to business problems. More particularly, this invention is concerned with a chart containing numerical designations which can be readily positioned on and yet removed from a backing member having a post for orientating the chart. Cords of the stretch type are placed over the chart at determined positions and retained thereon by magnets.

Devices for finding answers to business problems are described in U.S. Pats. 2,309,675 and 2,296,799. U.S. 2,309,675 describes a multicomponent and complex mechanism with many moving parts and no means to provide a permanent record of the final determination. U.S. 2,296,799 provides a more simplified means yet does not provide for a permanent record of a proposed business transaction nor does it provide for calculations of numerous business factors. The use of various magnetized materials and devices for displaying business factors, showing progress and scheduling, are disclosed in U.S. 3,186,323; 2,589,812, and 3,126,645, respectively. However, none of these patents describes the use of magnets for arranging cords over a chart containing numerical designations and allowing for innumerable determinations of various business factors. Neither does the prior art disclose a chart which can be readily and accurately positioned on a backing member for subsequent removal after the previously described determinations are made.

It is an object of the present invention to provide a novel and simplified device for making determinations of business factors. It is another object of this invention to provide a business determination device which can afford numerous business answers in a fast and accurate manner. It is yet another object of the invention to provide a business calculation apparatus which allows variations of business aspects to be plotted and answers readily read. It is still another object to provide a business calculation device which will afford a permanent record of determinations after they are made. Another object of the invention is to provide a business determining means which is easily manufactured without special tooling and at a minimum cost.

SUMMARY OF THE INVENTION

The foregoing objects are accomplished and the shortcomings of the prior art are overcome by the present device which comprises a backing member with a post for orientating a chart thereon and also serving as an attachment for stretch-type cords which are held at the opposite ends by magnets. A removable chart contains numerical indicia and is retained on the backing member by magnets. The stretch-type cords attached to the post and positioned over the chart by the magnets serve as delineation and calculation means for finding answers to various business problems as will be later explained.

2

BRIEF DESCRIPTION OF DRAWING

A better understanding of the present device for determining essential business factors will be accomplished by reference to the drawing wherein.

DESCRIPTION OF THE PREFERRED EMBODIMENT

Figure 1:
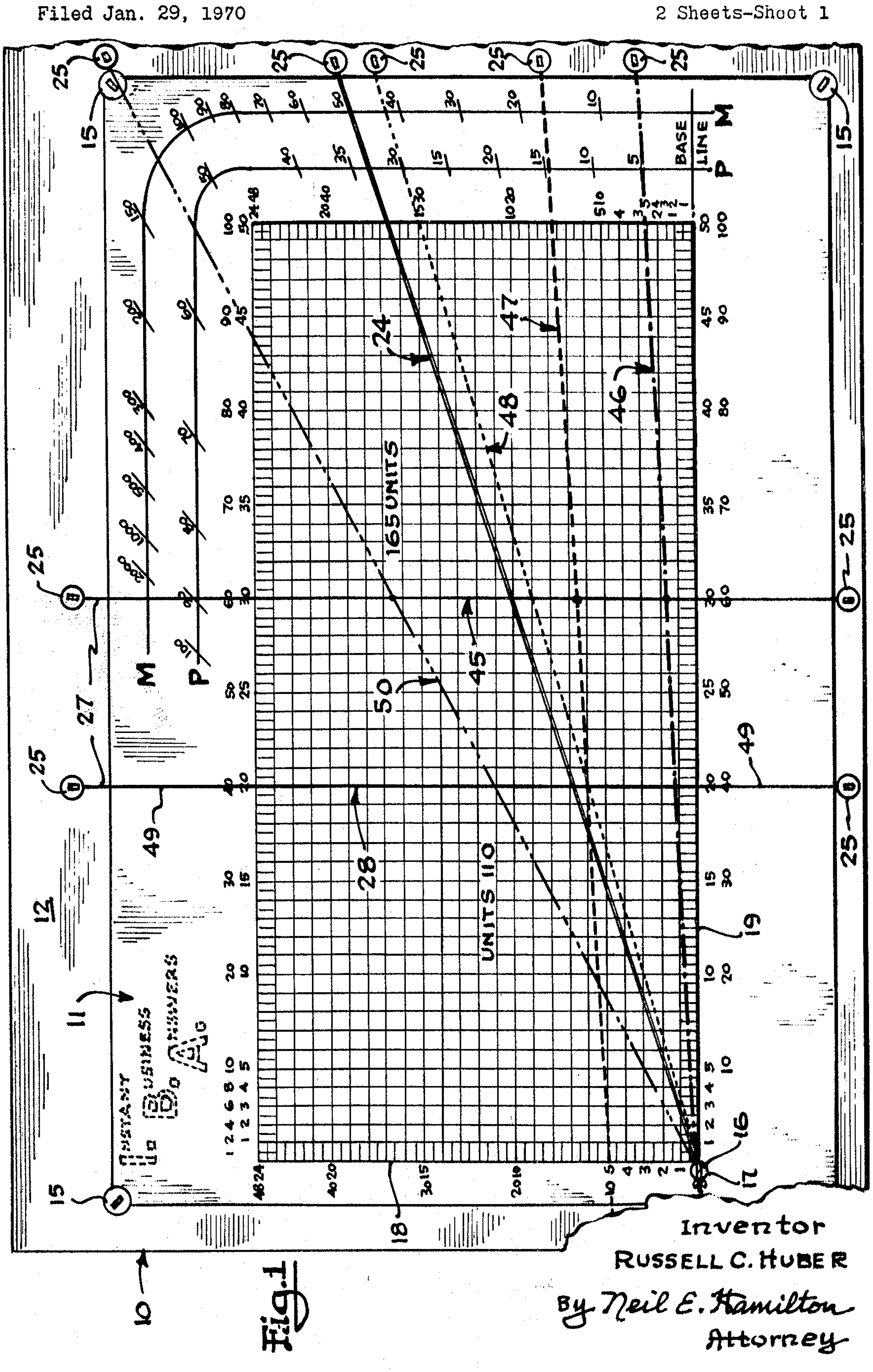
FIG. 1 is a view in side elevation of the chart held and positioned on a backing board with cords placed at various positions to illustrate a particular business profit and loss condition on the chart.

Proceeding to a detailed description of the present invention, FIG. 1 shows the device generally 10 composed of a chart 11 containing various numerical indicia and held against a metallic covered backing member 12 by means of four magnets positioned at the corners, three of which are shown at 15. A post element 16 is disposed at the lower left portion of the backing member 12, and chart 11 has a hole 17 placed at the junction of base line 19 and the left margin of the grid type indicia 18 on the chart to provide for placement of the chart 11 on the backing member in the correct position. Aiding in the correct positioning of the chart 11 on the backing member in conjunction with post 16 are four right angle markings, one of which is shown at 20 in FIG. 2. The remaining three markings are marked for coincident placing at the three remaining corners of the chart. Extending across chart 11 are two kinds of delineation means. One type as shown at 23 comprises a stretch-type cord 24 secured at one end in post 16 and securely but movably placed over the chart and held at the opposite end on the backing 12 by a magnetized holder 25. Extending across the chart and normal to the base line is the other type of delineation means 28 comprised of two magnetized holders 25 attached to opposing ends of stretch-type cords 27.

Figure 2:
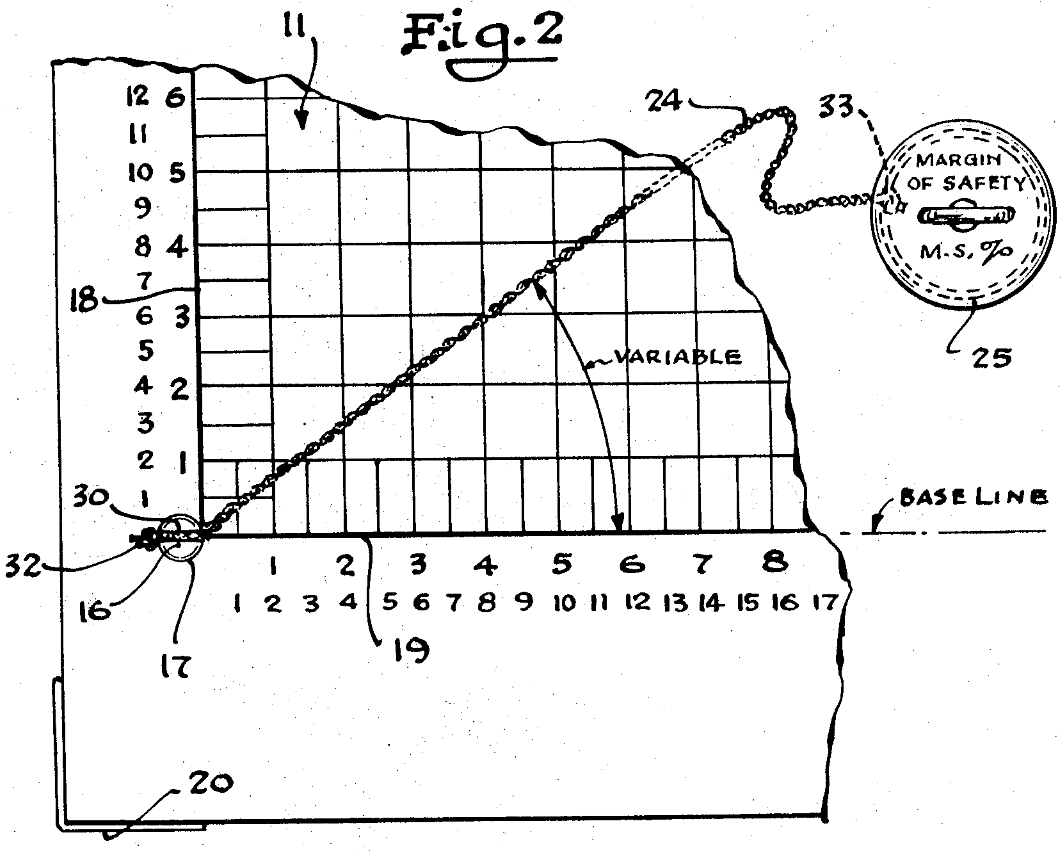
FIG. 2 is a detailed view in side elevation illustrating the positioning of a cord through the post with reference to the base line of the chart.
Figure 3:
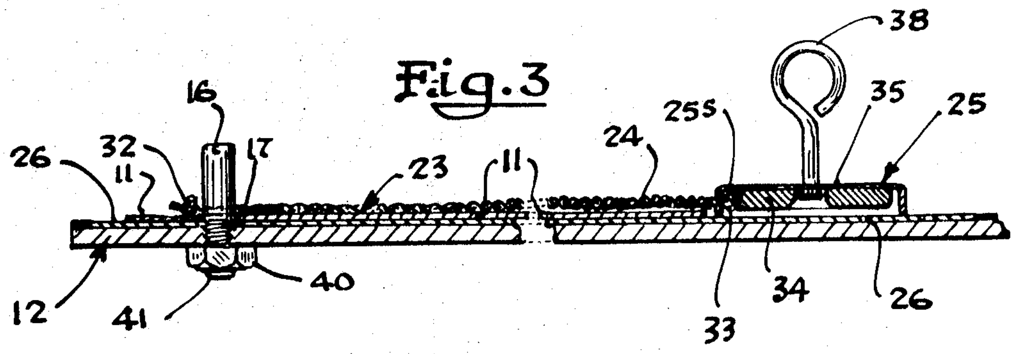
FIG. 3 is a view in vertical section of the backing member and of a magnetized holder for the cord.
Figure 4:
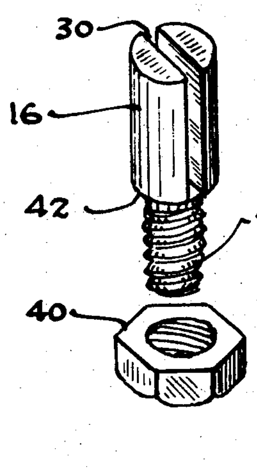
FIG. 4 is a detailed view of the post member in perspective.

As best seen in FIGS. 3 and 4, the stretch-type cord 24 is held in close proximity to the backing member 12 by post 16 which has a slot 30 extending down to the surface of the backing member 12 and chart 11. Also aiding in the close positioning is the disposition of cord 24 in the lateral surface of magnetized holder 25. Cord 24 is attached to post 16 and inside the skirt portion 25S of holder 25 by knots 32 and 33 (FIG. 2), respectively. An annular magnetized section 34 is attached to the concave body section 35 of holder 25 by handle 38 secured through body section 35 and against the inside of magnet holder 25 as by peening the end of handle 38. Magnet 34 is cemented in place by means of epoxy glue.

It will be noted in FIGS. 2 and 4 that the slotted post 16 is secured to backing 12 in the following manner: the backing 12 has a metallic face 26 which has been drilled and tapped to receive threads 41 on post 16. The unthreaded shoulder part 42 of post 16 prevents the post from going on through backing 12. By means of nut 40 the post 16 can be prevented from changing the previously fixed position of slot 30 which must be in line with the base line 19 for accurate determinations.

OPERATION

A better understanding of the advantages of the business answer device 10 will be had by a description of its operation. It will be noted that numerical designations are assigned to the horizontal and vertical lines on chart 11. There is no limit to the value assigned where the chart is employed, for example, to project business factors based on a profit and loss statement. For example, the following simple profit and loss statement will be used to illustrate one of the end uses of the system:

| | | |
|---|---|---|
| Volume of sales | | $30,000 |
| Cost of merchandise | $14,500 | |
| Labor | 6,500 | 21,000 |
| | 21,000 | |
| Gross profit | | 9,000 |
| Variable expense | 1,500 | |
| Fixed and overhead expense | 5,000 | 6,500 |
| | 6,500 | |
| Net profit | | 2,500 |

Total production 165 units.

The squares on the chart can represent a value of 1 or 10 or 100 or 1,000 or 10,000 or 100,000, etc. or they can be 2 or 20 or 200 or 2,000 or 20,000 or 200,000, etc. If a value of 1, 10, etc. is assigned, the inner numbers surrounding the grid on the chart are used, whereas if a value of 2, 20, etc., is assigned, the outer numbers are used. The volume of a sales figure of $30,000 is indicated in the following manner: first, a value of $1,000 is given to each square. On the lower horizontal base line one locates the figure 30 on the inner row of numbers, and on the extreme upper horizontal line one also locates the figure 30 on the inner row of numbers. One then stretches cord 45 vertically through these two 30 figures and places magnets 25 above and below chart 11. For ease in later recognizing the lines and the magnets, they are color-coded and the magnets have identification of the function they represent. Cord 45 is black and the magnets 25 are identified (volume of sales) at each end of the cord. The $30,000 volume figure is then recorded on the chart at the appropriate space provided below the base line. The next item to be plotted is variable expenses which vary up and down in proportion to volume of sales. In this example, a variable expense of $1,500 is plotted by cord 46, one end of which is inserted in slot 30 of post 16 and retained by a knot such as shown at 32. This delineation means is the same as shown generally at 23 and cord 46 (an orange line) is positioned by means of a magnet 25 with cord 46 passing over line 45 one and one-half squares or $1,500 up from the base line with magnet 25 (identified variable sales) located beyond the chart to the extreme right on backing 12. In this position one is able then to read the variable expense of 5% of sales on line P—P which surrounds the right margin of the grid lines and extends across a portion of the top of the grid. All figures on line P—P as well as the outer corresponding line M—M are percentage figures.

Total fixed expenses including overhead expenses are next plotted at a value of $5,000 by employing the delineation means such as 28 having two magnets 25 (identified fixed expenses) only one of which is shown for cord 47 (a red color) which is positioned to pass over the number 5 in the left vertical column and five squares up from line 46 across the chart. The total expense of $6,500 will be 6½ squares upon line 45. A gross profit of $9,000 is to be indicated next on chart 11 and this plotted in a manner similar to cord 46 by inserting cord 48 through slot 30 with a knot 32 and locating the other end with a magnet 25 (identified gross profit) so that cord 48 (gold in color) passes over cord 45 exactly at the $9,000 mark or 9 squares up from the base line. This now permits one to read gross profit as 30% of the sales figure on line P—P and the gross profit as a scant 43% markup over cost of goods on line M—M. The difference between the red cord 47 and gold cord 48 where they pass over cord 45 will be 2½ squares or a net profit of $2,500.

An important aspect in any business operation is the recognition of the break even point. This is shown on chart 11 at the point where cords 48 and 47 cross. This is identified by placing cord 49 (green color) with 2 magnets 25 (break even point) vertically through the point where cords 48 and 47 cross. One will find that the cord 49 crosses the base line and extreme upper line at position 20 which identifies the break even point as $20,000 for the profit and loss statement just plotted. The wedge formed from lines 48 and 47 to the left of the intersection is the net loss at any volume of sales below the break even point, whereas the wedge to the right is the net profit at any volume above this point.

As shown on the chart, the possible net profit potential is indicated by referring to the point where cord 46 representing variable expenses crosses line P—P which reads 5%. Next, reference is made to the point where cord 48 representing gross profit crosses line P—P which is 30%. The difference between these two figures is 25% and represents the net profit potential or that share of every dollar of sale that will be net profit after reaching the break even point.

The versatility of the present device is further illustrated by its ability to show a margin of safety. One deducts the value of the break even point ($20,000) from the value of the volume of sales ($30,000) and arrives at a figure of $10,000. Cord 24 is inserted through slot 30 of post 16 in a manner described for cords 46, 47 and 48 and magnet 25 is positioned so that cord 24 (brown color) crosses volume of sales cord 45 at a point $10,000 up from the base line. The margin of safety is read on P—P as 33⅓% and one knows that if the present volume of sales falls off by 33⅓% one will fall back to the break even point.

When the business being analyzed in a manufacture of a single product, it is very simple to establish a production of units to break even point. As an illustration: if the total production of 165 is established on volume line 45 at a point 16½ squares up from the base line, then cord 50 stretched through this point will immediately establish a break even point for production on line 49 which will read 110 units to break even.

Further usefulness of the present device is indicated by its ability to give business answers when changes in business conditions occur. Colored pencils corresponding to the colored cords are employed to mark positions where the cords extend across the squared grid. The cords are then removed and the monetary values of the various factors which were previously plotted are outlined on the chart and then future goals are established by replacing the cords and magnets to see how, for example, an increase in the markup from 43% to 50% affects net profit and how far back the break even point moves. Or one can project an increase in sales volume to $36,000 and the device 10 will indicate what can be expected in terms of net profit. By using the past performance figures as a base, instantaneous and realistic decisions can be made for the future and established as goals.

It will thus be seen that through the present invention there is now provided a business answer device which is simple in construction yet provides ready and accurate answers. A permanent record of any of the determined aspects is afforded, and the permanent record can be used as a base from which variations can be made and their effect seen. The present device can be readily manufactured without special tooling and at low cost. The backing member can be used an indefinite number of times without affecting the accuracy of the determinations as was a prior problem when placement holes were employed.

The disclosed device is useful to produce meaningful answers for the successful operation of any business large or small and can also be used for educational purposes so that a student can readily see cause and effect change on any factor contributing toward a successful business.

The preferred material for forming a backing member 12 is a prefinished painted or porcelainized steel sheet laminated to a 3/16" hardboard backing to form a rigid flat surface capable of holding magnets. However, a metallic sheet could be used alone or a plastic material with a metallic laminate or an imbedded metallic sheet. Post 16 is fabricated from aluminum but could be made from steel, injected molded plastic or similar suitable material. Magnet holders 25 are made from steel and are a readily available item with the exception that magnets 34 are positioned so that a side could be drilled to accommodate cord 24 with knot 33. In place of steel, plastic or aluminum could be employed. However, steel or iron offer the advantage of being attracted by the magnet in case of failure of the epoxy cement. Any suitable magnetized means which will afford magnetic attraction between the holder 25 and base 12 through chart 11 can be utilized for permanent magnets 34. Iron, steel or iron-silicon are preferred. Elastic type cords such as 24 and 27 are stock, standard cords manufactured for the stretch clothing industry. If desired, any other stretch type material such as plain rubber or a plastic composition which will retain tension after stretching can be used. A good grade of paper is the preferred material for chart 11. Alternatively, any low cost thin material which can be marked with numerical indicia can be used, such as thin cardboard or plastic.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. A device for determining essential business factors comprising: a backing member; a post element carried by said backing member; a chart placeable on and removable from said backing member containing various indicia; an opening in said chart adapted to receive said post member at the base of said chart and to be orientated for accurate determinations by means of said post element; means to secure said chart to said backing member; and a multiplicity of delineation means adapted to be removably positioned over said chart free of penetration from said chart and secured to said post member at one end.

2. The device as defined in claim 1 wherein said backing member is composed partially of magnetized metal and said means for securing said chart to said backing is at least one magnet.

3. The device as defined in claim 2 wherein said delineation means is comprised in part of a magnet.

4. The device as defined in claim 3 wherein said delineation means are formed from several independent members each composed of a magnetized positioning member and a cord.

5. The device as defined in claim 1 wherein said post member contains a slot and said delineation means comprises a cord adapted to be received by said slot.

6. The device as defined in claim 5 further including orientation indicia carried by said backing member for aligning said chart on said backing member in conjunction with the slot in said post member.

7. A device as defined in claim 6 wherein said slot in said post member extends from the extreme outer surface of said post remote from said backing member, to the surface of said backing member.

8. A device as defined in claim 7 wherein said cord is carried by a magnetized positioning member comprising a skirt portion adapted to position said delineation means adjacent the surface of said chart.

9. The device as defined in claim 8 wherein said cord is of the stretch type.

10. The device as defined in claim 9 wherein said cord is of the elastic variety.

References Cited

UNITED STATES PATENTS

| | | | |
|---|---|---|---|
| 1,068,390 | 7/1913 | Jarrell | 235—89 |
| 2,296,799 | 9/1942 | Rosin | 235—61 B |
| 3,156,056 | 11/1964 | Pribil | 35—7 A |
| 3,380,177 | 4/1968 | Wagner | 35—24 R |

WILLIAM H. GRIEB, Primary Examiner

U.S. Cl. X.R.

35—7 A; 116—130; 235—89 A